United States Patent
Winkler

(10) Patent No.: US 10,919,109 B2
(45) Date of Patent: Feb. 16, 2021

(54) METHOD FOR PRODUCING A PISTON FOR AN INTERNAL COMBUSTION ENGINE CONSISTING OF A PISTON UPPER PART AND OF A PISTON LOWER PART

(71) Applicant: Mahle International GmbH, Stuttgart (DE)

(72) Inventor: Peter Winkler, Stuttgart (DE)

(73) Assignee: MAHLE INTERNATIONAL GMBH

(*) Notice: Subject to any disclaimer, the term of this patent is extended or adjusted under 35 U.S.C. 154(b) by 193 days.

(21) Appl. No.: 16/019,516

(22) Filed: Jun. 26, 2018

(65) Prior Publication Data

US 2018/0369955 A1    Dec. 27, 2018

(30) Foreign Application Priority Data

Jun. 27, 2017    (DE) .................... 10 2017 210 818

(51) Int. Cl.
*B23K 20/12*    (2006.01)
*F02F 3/00*    (2006.01)
(Continued)

(52) U.S. Cl.
CPC .......... *B23K 20/129* (2013.01); *B23K 33/006* (2013.01); *B23K 33/008* (2013.01);
(Continued)

(58) Field of Classification Search
CPC .. B23K 20/129; B23K 33/006; B23K 33/008; B23K 2101/003; B23K 20/1245;
(Continued)

(56) References Cited

U.S. PATENT DOCUMENTS 6,260,472 B1 * 7/2001 Zhu .................... F02F 3/003
                                                            92/214
6,279,455 B1 * 8/2001 Kruse .................... F02F 3/003
                                                            29/888.042

(Continued)

FOREIGN PATENT DOCUMENTS

DE    1 04 464 A1    6/1973
DE    84 24 774 U1    11/1984
(Continued)

OTHER PUBLICATIONS

English abstract for DE-197 45 123.
(Continued)

*Primary Examiner* — Kiley S Stoner
(74) *Attorney, Agent, or Firm* — Fishman Stewart PLLC

(57) ABSTRACT

A method for producing a piston for an internal combustion engine may include arranging a piston upper part and a piston lower part in a friction welding device. The piston upper part may include a piston head with a combustion recess. The piston lower part may include two mutually opposite skirt elements connected to one another via two mutually opposite pin bosses. The method may also include arranging a deflecting device configured to deflect at least one weld bead one of on and in the friction welding device. The method may further include joining the piston upper part and the piston lower part to one another via friction welding.

20 Claims, 1 Drawing Sheet

(51) Int. Cl.
 *F02F 3/22* (2006.01)
 *B23K 33/00* (2006.01)
 *B23K 101/00* (2006.01)

(52) U.S. Cl.
 CPC ............... *F02F 3/003* (2013.01); *F02F 3/22* (2013.01); *B23K 2101/003* (2018.08); *F02F 2003/0061* (2013.01)

(58) Field of Classification Search
 CPC ....... B23K 20/12–1215; B23K 20/1285–1295; F02F 3/22; F02F 3/003; F02F 2003/0061
 USPC .............................. 228/112.1–114.5, 2.1–2.3
 See application file for complete search history.

(56) References Cited

U.S. PATENT DOCUMENTS

| | | | | |
|---|---|---|---|---|
| 6,491,013 | B1* | 12/2002 | Gaiser | F02F 3/003 |
| | | | | 123/193.6 |
| 8,863,718 | B2* | 10/2014 | Rebello | F02F 3/003 |
| | | | | 123/193.6 |
| 9,108,274 | B2* | 8/2015 | Boczek | B23P 15/10 |
| 2003/0037671 | A1* | 2/2003 | Zhu | F02F 3/003 |
| | | | | 92/231 |
| 2010/0006055 | A1* | 1/2010 | Garcia | B21K 25/00 |
| | | | | 123/193.6 |
| 2010/0107999 | A1* | 5/2010 | Scharp | F02F 3/003 |
| | | | | 123/41.35 |
| 2010/0108000 | A1* | 5/2010 | Scharp | F02F 3/003 |
| | | | | 123/41.35 |
| 2010/0108015 | A1* | 5/2010 | Scharp | F02F 3/22 |
| | | | | 123/193.6 |
| 2012/0145112 | A1* | 6/2012 | Scharp | F02F 3/22 |
| | | | | 123/193.6 |
| 2012/0222305 | A1* | 9/2012 | Scharp | F02F 3/22 |
| | | | | 29/888.042 |
| 2012/0279390 | A1* | 11/2012 | Boczek | B23K 37/053 |
| | | | | 92/186 |
| 2012/0304956 | A1* | 12/2012 | Wang | F02F 3/003 |
| | | | | 123/193.6 |
| 2013/0000483 | A1* | 1/2013 | Scharp | F02F 3/22 |
| | | | | 92/176 |
| 2013/0068094 | A1* | 3/2013 | Ribeiro | B23P 15/10 |
| | | | | 92/172 |
| 2014/0000453 | A1* | 1/2014 | Wilder | F02F 3/0015 |
| | | | | 92/208 |
| 2014/0202404 | A1* | 7/2014 | Weinenger | F16J 1/22 |
| | | | | 123/41.35 |
| 2014/0230646 | A1* | 8/2014 | Schneider | F02F 3/22 |
| | | | | 92/172 |
| 2014/0230774 | A1* | 8/2014 | Schneider | F02F 3/0015 |
| | | | | 123/193.6 |
| 2014/0238232 | A1* | 8/2014 | Lapp | F02F 3/003 |
| | | | | 92/172 |
| 2014/0260960 | A1* | 9/2014 | Lapp | F16J 1/005 |
| | | | | 92/186 |
| 2014/0305401 | A1* | 10/2014 | Ottliczky | F02F 3/22 |
| | | | | 123/193.6 |
| 2015/0135533 | A1* | 5/2015 | Scharp | B23K 20/12 |
| | | | | 29/888.044 |
| 2016/0061326 | A1* | 3/2016 | Weiss | F02F 3/22 |
| | | | | 92/260 |
| 2016/0177865 | A1* | 6/2016 | Weinenger | F02F 3/0015 |
| | | | | 123/193.6 |
| 2016/0186686 | A1* | 6/2016 | Azevedo | F02F 3/22 |
| | | | | 123/41.38 |
| 2016/0222911 | A1* | 8/2016 | Salenbien | F02F 3/18 |
| 2017/0030291 | A1* | 2/2017 | Muller | F02F 3/22 |
| 2017/0058824 | A1* | 3/2017 | Weiss | F02F 3/26 |
| 2017/0138297 | A1* | 5/2017 | Laqua | F02F 3/003 |
| 2017/0314503 | A1* | 11/2017 | Rasmussen | F02F 3/0069 |
| 2017/0320160 | A1* | 11/2017 | Schmicker | B23K 20/12 |
| 2018/0100465 | A1* | 4/2018 | Kim | F02F 3/22 |
| 2018/0119635 | A1* | 5/2018 | Wandrie, III | F02F 3/22 |
| 2018/0119636 | A1* | 5/2018 | Keller | B23K 20/129 |
| 2018/0156156 | A1* | 6/2018 | Yang | F02F 3/0015 |
| 2018/0161901 | A1* | 6/2018 | Yang | B23K 1/0008 |
| 2018/0202387 | A1* | 7/2018 | Wandrie, III | B21K 1/18 |
| 2018/0236555 | A1* | 8/2018 | Weinenger | B22F 3/11 |
| 2018/0334992 | A1* | 11/2018 | Matsuo | F02F 3/003 |
| 2019/0010892 | A1* | 1/2019 | Lapp | F02F 3/003 |
| 2019/0107076 | A1* | 4/2019 | Fregni | F02F 3/00 |
| 2020/0070289 | A1* | 3/2020 | Hrdina | B23K 20/12 |

FOREIGN PATENT DOCUMENTS

| | | | | |
|---|---|---|---|---|
| DE | 197 45 123 C1 | 6/1999 | | |
| DE | 10049786 A1 * | 5/2001 | ............. | C22C 38/12 |
| DE | 102004019012 A1 | 11/2005 | | |
| DE | 102004061778 A1 * | 4/2006 | ............... | F01P 3/10 |
| DE | 10 2010 026 760 A1 | 1/2012 | | |
| DE | 102011100521 A1 | 2/2012 | | |
| JP | 2006052671 A | 2/2006 | | |
| JP | 2010155265 A | 7/2010 | | |
| WO | WO-2007031107 A1 * | 3/2007 | ............. | F02F 3/003 |

OTHER PUBLICATIONS

English abstract for DE-102004019012.
English abstract for DE-10 2010 026 760.
English abstract for DE-102011100521.
English abstract for JP-2006052671.
English abstract for JP-2010155265.
European search report dated Nov. 29, 2018.

* cited by examiner

METHOD FOR PRODUCING A PISTON FOR AN INTERNAL COMBUSTION ENGINE CONSISTING OF A PISTON UPPER PART AND OF A PISTON LOWER PART

CROSS-REFERENCE TO RELATED APPLICATIONS

This application claims priority to German Patent Application No. DE 10 2017 210 818.5 filed on Jun. 27, 2017, the contents of which are incorporated herein by reference in its entirety.

TECHNICAL FIELD

The present invention relates to a method for producing a piston for an internal combustion engine consisting of a piston upper part and of a piston lower part. The invention further relates to a friction welding device which is designed for carrying out this method.

BACKGROUND

It is known from the prior art that, to assemble a piston, the piston upper part and the piston lower part can be fastened to one another by means of friction welding.

However, it often proves disadvantageous here that a weld bead typically occurring during the friction welding is formed in regions of the piston, in particular in the inner shape of the piston below the piston recess, which actually have to be kept free for the connecting rod movement.

It is therefore an object of the present invention to provide an improved embodiment for a production method for a piston upper part or piston lower part in which the aforementioned disadvantage no longer occurs or at most occurs in a greatly attenuated form.

SUMMARY

This problem is solved according to the invention by the subject matter of the independent claim(s). Advantageous embodiments form the subject matter of the dependent claim(s).

Accordingly, the basic concept of the invention is that, before a piston upper part and a piston lower part are joined by means of friction welding, there be provided on a friction welding device designed therefor a deflecting device on which the weld bead occurring in the course of the friction welding operation is in abutting contact and is thus deflected. Such a deflection of the weld bead ensures that clearances required for the movement of the connecting rod are unrestricted. In particular, with a suitable construction of the deflecting device, it is possible to prevent a situation in which the weld bead is formed at locations at which it would be mechanically in contact with the connecting rod after the connecting rod has been mounted on the piston.

The method according to the invention for producing a piston consisting of a piston upper part and a piston lower part by means of a friction welding device comprises a method step a). According to this method step a), a piston upper part and a piston lower part are provided for joining to one another. The piston upper part and/or the piston lower part preferably consist/consists of a steel. The piston upper part has a piston head with a combustion recess. The piston lower part has two mutually opposite skirt elements which are connected to one another via two mutually opposite pin bosses. In a method step b), a deflecting device is provided.

The deflecting device can be fastened to a clamping device of the friction welding device to clamp in the piston upper part and/or piston lower part. In this case, the deflecting device is a component which is separate from the clamping device and which can be fastened, preferably releasably, to the clamping device. Alternatively, however, an integral formation of the deflecting device with the clamping device is also conceivable. In all the aforementioned variants, the deflecting device is designed for deflecting at least one weld bead occurring during the friction welding of the piston upper part and piston lower part.

In a method step c), the piston upper part and the piston lower part are finally joined to one another in the friction welding device by means of friction welding. After the friction welding, a post-processing of the said weld bead—to ensure the presence of the said clearances—can be dispensed with.

According to a preferred embodiment, the deflecting device is designed and/or dimensioned in such a way that, after the actual connecting rod has been mounted on the piston, the weld bead occurring during the friction welding is arranged at a distance from the connecting-rod eye of this connecting rod. Such an overdimensioning of the deflecting device makes it possible to particularly effectively avoid an undesired mechanical contact of the connecting-rod eye of the connecting rod with the weld bead occurring during the friction welding.

According to another preferred embodiment of the method, the piston lower part provided in step a) has a radially inner and radially outer annular wall which project upwardly from the skirt elements towards the piston upper part. In this embodiment, an interspace formed between these two annular walls forms a lower part of a cooling duct of the piston formed from the piston upper part and piston lower part. The deflecting device and the piston lower part are tailored to one another in such a way that, according to step b), the deflecting device, after being mounted on the piston lower part, bears at least in certain portions on its radially inner annular wall.

According to an advantageous development, in method step b), a through-opening enclosed by the inner annular wall of the piston lower part is partially closed by the deflecting device.

In method step b), the deflecting device is preferably brought to bear by way of an annular contact portion against the radially inner annular wall of the piston lower part. The annular contact portion is preferably an outer edge of the deflecting device.

In a further advantageous development, the piston upper part provided in step a) has a radially inner and radially outer annular wall which project downwardly from the piston head towards the piston lower part. Here, an interspace formed between the two annular walls forms an upper part of a cooling duct of the piston formed from the piston upper part and piston lower part. In this development of the method, in step c), the two radially inner annular walls and the two radially outer annular walls are connected to one another by means of friction welding.

The invention furthermore relates to a friction welding device for producing a piston for an internal combustion engine, which comprises a piston upper part and a piston lower part, wherein the friction welding device is designed for joining the piston upper part and piston lower part to one another by means of friction welding. In particular, the friction welding device is configured to carry out the method set out above, and therefore the above-explained advantages of the method can be applied to the friction welding device.

The friction welding device according to the invention comprises a clamping device for clamping in the piston upper part and the piston lower part. A deflecting device for deflecting the weld bead occurring during the friction welding is essential to the invention. This deflecting device is preferably fastened, in particular releasably, to the clamping device. An integral formation of the deflecting device with the clamping device is alternatively conceivable.

In an advantageous development, at least one cooling agent duct through which a cooling agent can flow is formed in the deflecting device. In this way, an overheating of the deflecting device during the friction welding operation can be prevented.

In a further preferred embodiment, the deflecting device is designed and/or dimensioned in such a way that, after a connecting rod has been mounted on the piston, the weld bead occurring during the friction welding is arranged at a distance from the connecting-rod eye of this connecting rod. Such an overdimensioning of the deflecting device makes it possible to particularly effectively avoid an undesired mechanical contact of the connecting-rod eye of the connecting rod with the weld bead occurring during the friction welding. With particular preference, the deflecting device is provided, at least in certain regions, in particular in a region in which the weld bead will form, with larger external dimensions than the connecting-rod eye of the connecting rod to be mounted on the piston. Such an overdimensioning of the deflecting device makes it possible to particularly effectively avoid an undesired mechanical contact of the connecting-rod eye of the connecting rod with the weld bead occurring during the friction welding.

With the piston lower part clamped in the clamping device, the deflecting device expediently partially closes a through-opening enclosed by the inner annular wall of the piston lower part.

In an advantageous development, the deflecting device has an annular contact portion which, with the piston lower part clamped in the clamping device, bears against the radially inner annular wall of the piston lower part. The annular contact portion is particularly expediently an outer edge of the deflecting device.

With particular preference, a region of the deflecting device that faces the piston upper part when the piston lower part is clamped in the clamping device has, in a longitudinal section of the piston lower part, the surface contour of a circle segment.

According to a further preferred embodiment, the piston upper part has a radially inner and a radially outer annular wall which project downwardly from the piston head towards the piston lower part. Here, an interspace formed between these two annular walls forms an upper part of the cooling duct of the piston formed from the piston upper part and piston lower part. In this embodiment, the piston lower part has a radially inner and a radially outer annular wall which project upwardly from the skirt elements towards the piston upper part. Here, an interspace present between these two annular walls forms a lower part of a cooling duct of the piston formed from the piston upper part and piston lower part.

Further important features and advantages of the invention will become apparent from the subclaims, from the drawing and from the associated description of the figures with reference to the drawings.

Preferred exemplary embodiments of the invention are illustrated in the drawings and are explained in more detail in the following description.

BRIEF DESCRIPTION OF THE DRAWINGS

In the drawings, each in schematic form.

DETAILED DESCRIPTION

Figure 1:
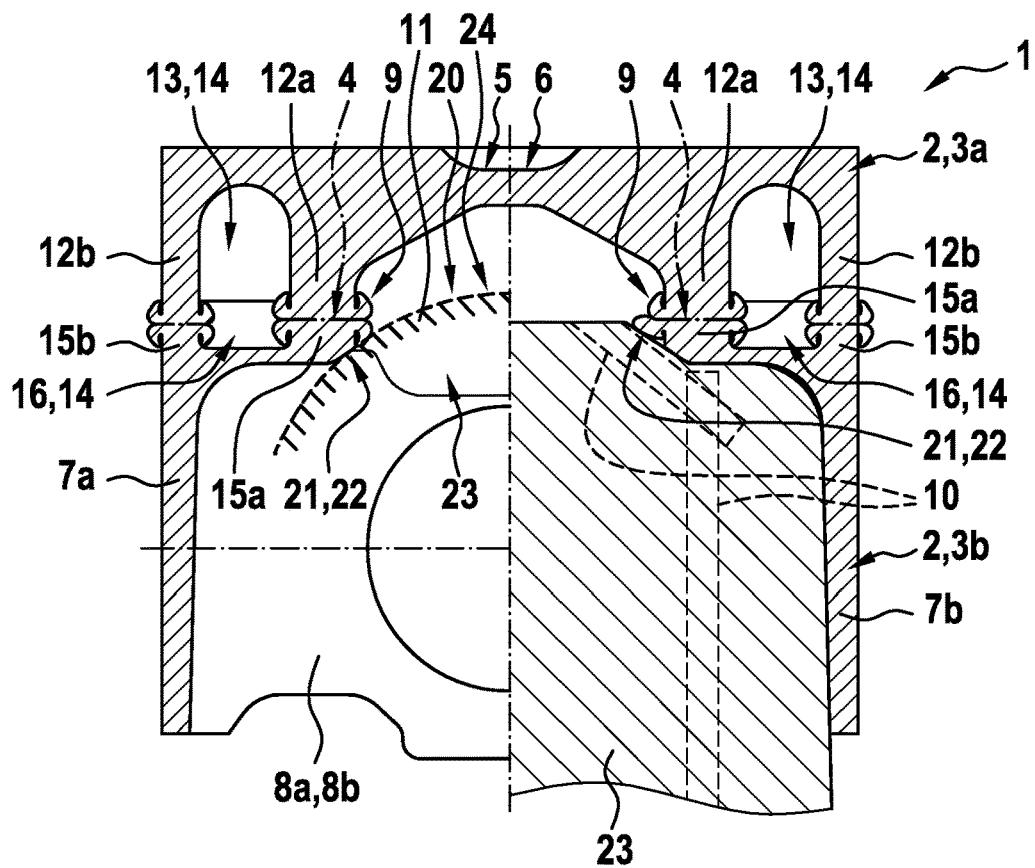
FIG. 1 shows an example of a friction welding device according to the invention for producing a piston.
Figure 2:
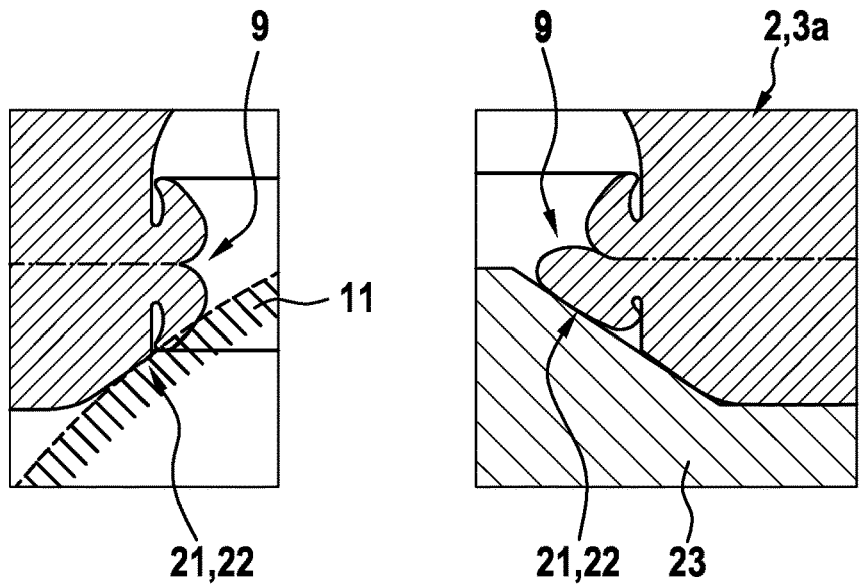
FIG. 2 shows a detail illustration of FIG. 1 in the region of the weld bead.

FIGS. 1 and 2 illustrate an example of a friction welding device 1 according to the invention for producing a piston 2 for an internal combustion engine consisting of a piston upper part 3a and of a piston lower part 3b, each made of steel. The friction welding device 1 serves for joining the piston upper part 3a and piston lower part 3b by means of friction welding. The friction welding device 1 comprises a clamping device 23 (shown only partially in the figure) into which the piston upper part 3a and the piston lower part 3b can be clamped for friction welding. The more precise technical design of a friction welding device 1 is known to a person skilled in the relevant art, and therefore a more detailed explanation will be dispensed with in the following.

The piston upper part 3a comprises a piston head 5 with a combustion recess 6. The piston lower part 3b has two mutually opposite skirt elements 7a, 7b which are connected to one another via two mutually opposite pin bosses 8a, 8b. The piston upper part 3a has a radially inner annular wall 12a which projects downwardly from the piston head 5 towards the piston lower part 3b, and a radially outer annular wall 12b which projects downwardly from the piston head 5 towards the piston lower part 3b. An interspace 13 is present between the two annular walls 12a, 12b and forms an upper part of a cooling duct 14 of the piston 2 formed from the piston upper part 3a and the piston lower part 3b. The piston lower part 3b has a radially inner annular wall 15a which projects upwardly from the skirt elements 7a, 7b towards the piston upper part 3a. The piston lower part 3b also has a radially outer annular wall 15b which projects upwardly from the skirt elements 7a, 7b towards the piston upper part 3a. An interspace 16 is present between the two annular walls 15a, 15b and forms a lower part 25 of the cooling duct 14. In the example scenario, after the friction welding operation has been concluded, the two radially inner annular walls 12a, 15a and the two radially outer annular walls 12b, 15b are connected to one another by means of a friction welding connection 4.

To produce the friction welding connection 4, the piston upper part 3a and, alternatively or additionally, the piston lower part 3b are, after being clamped into the clamping device 23 of the friction welding device 1, set in rotation by the latter and forced under pressure against the respective friction partner, with the result that the joining surfaces of the radially inner annular walls 12a, 15a are heated to the joining temperature. After a certain time period has elapsed, the rotation is stopped again. The piston upper part 3a and the piston lower part 3b are moved towards one another in the friction welding device 1 with an increase of the initial contact pressure, with the result that an integrally bonded connection is produced between the two piston parts 3a, 3b with the formation of a weld bead. The travel distance by which the piston upper part 3a and the piston lower part 3b are moved towards one another is often referred to as "upset travel". The greater the upset travel, the greater the weld bead 9 formed during the friction welding.

In order to prevent an undesired penetration of the weld bead occurring during the friction welding into a clearance to be kept free in the piston 2, the friction welding device 1 comprises a deflecting device 11 for deflecting the weld bead 9 occurring during the friction welding. The weld bead 9 which is formed during the friction welding makes abutting contact with the deflecting device 11 and is in this way deflected with the result that it can no longer enter the said clearance. The deflecting device 11 can be fastened, preferably releasably, to the clamping device 23. Also conceivable, however, is an integral formation of the deflecting device 11 with the clamping device 23.

The deflecting device 11 is dimensioned in such a way that, after the actual connecting rod has been mounted on the piston (not shown), the weld bead 9 occurring during the friction welding is arranged at a distance from the connecting-rod eye of this connecting rod (not shown). For this purpose, the deflecting device 11 can be provided, at least in that region in which the weld bead 9 will make abutting contact, with larger external dimensions than a connecting-rod eye of the connecting rod.

As can be seen from FIG. 1, the deflecting device 11 has an annular contact portion 21 which bears against the radially inner annular wall 15a. The annular contact portion 21 is preferably an outer edge 22 of the deflecting device 11. Here, in the state in which it is fastened to the piston lower part 3b, the deflecting device 11 partially closes a through-opening 20 enclosed by the radially inner annular wall 15a. A region 24 of the deflecting device 11 that faces the piston upper part 3a has, in the longitudinal section of the piston lower part 3b shown in FIG. 1, the surface contour of a circle or cylinder segment.

As FIGS. 1 and 2 clearly illustrate, at least one cooling agent duct 10 through which a cooling agent can flow can also be formed in the deflecting device 11. In this way, an overheating of the deflecting device 11 during the friction welding is prevented. The cooling agent duct 10 can be part of a cooling circuit. The said cooling agent can be a protective gas, for example nitrogen, but also air. The use of a liquid cooling medium is also possible.

The invention claimed is:

1. A method for producing a piston for an internal combustion engine comprising:
    arranging a piston upper part and a piston lower part in a friction welding device, wherein the piston upper part has a piston head with a combustion recess, and wherein the piston lower part has two mutually opposite skirt elements connected to one another via two mutually opposite pin bosses;
    arranging a deflecting device configured to deflect at least one weld bead one of on and in the friction welding device; and
    joining the piston upper part and the piston lower part to one another via friction welding.

2. The method according to claim 1, further comprising mounting a connecting rod on at least one of the piston lower part and the piston upper part, wherein joining the piston upper part and the piston lower part to one another via friction welding includes producing the at least one weld bead, and wherein arranging the deflecting device includes arranging the deflecting device such that the at least one weld bead is disposed at a distance from a connecting-rod eye of the connecting rod.

3. The method according to claim 2, wherein, at least in certain regions, the deflecting device has larger external dimensions than the connecting-rod eye of the connecting rod.

4. The method according to claim 1, wherein:
    joining the piston upper part and the piston lower part includes forming a cooling duct, the piston lower part including a radially inner annular wall and a radially outer annular wall projecting from the two skirt elements towards the piston upper part such that an interspace defined between the radially inner annular wall and the radially outer annular wall defines a lower part of the cooling duct; and
    arranging the deflecting device includes arranging the deflecting device such that the deflecting device bears, at least in certain portions, on the radially inner annular wall of the piston lower part.

5. The method according to claim 4, wherein arranging the deflecting device further includes arranging the deflecting device such that a through-opening disposed in the radially inner annular wall of the piston lower part is partially closed by the deflecting device.

6. The method according to claim 4, wherein arranging the deflecting device includes:
    inserting at least a portion of the deflecting device into the lower piston part; and
    arranging the deflecting device such that an annular contact portion of the deflecting device bears against the radially inner annular wall of the piston lower part.

7. The method according to claim 1, wherein:
    joining the piston upper part and the piston lower part includes forming a cooling duct, the piston upper part including a radially inner upper annular wall and a radially outer upper annular wall projecting from the piston head towards the piston lower part such that an upper interspace defined between the radially inner upper annular wall and the radially outer upper annular wall defines an upper part of the cooling duct, and the piston lower part including a radially inner lower annular wall and a radially outer lower annular wall projecting from the two skirt elements towards the piston upper part such that a lower interspace defined between the radially inner lower annular wall and the radially outer lower annular wall defines a lower part of the cooling duct; and
    joining the piston upper part and the piston lower part via friction welding includes joining the radially inner upper annular wall and the radially inner lower annular wall to one another and joining the radially outer upper annular wall and the radially outer lower annular wall to one another via friction welding.

8. The method according to claim 3, wherein the deflecting device has larger external dimensions than the connecting-rod eye of the connecting rod in a region where the at least one weld bead will form when joining the piston upper part and the piston lower part to one another via friction welding.

9. The method according to claim 4, wherein arranging the deflecting device includes arranging the deflecting device such that an annular contact portion of an outer edge of the deflecting device bears against the radially inner annular wall of the piston lower part.

10. The method according to claim 1, wherein arranging the deflecting device includes disposing at least a portion of the deflecting device between the two skirt elements.

11. The method according to claim 1, wherein arranging the deflecting device includes inserting at least a portion of the deflecting device into a space disposed within the lower piston part and defined at least partially by the two skirt elements and the two pin bosses.

12. The method according to claim 1, wherein arranging the deflecting device includes abutting the deflecting device against a radially inner annular wall of the piston lower part, the radially inner annular wall disposed in a space of the lower piston part defined at least partially by the two skirt elements and the two pin bosses.

13. The method according to claim 12, wherein abutting the deflecting device against the radially inner annular wall includes at least partially closing a through-opening defined by the radially inner annular wall.

14. The method according to claim 1, wherein joining the piston upper part and the piston lower part to one another via friction welding includes:
   producing the at least one weld bead; and
   keeping a clearance for receiving a connecting rod free of the at least one weld bead via deflecting the at least one weld bead with the deflecting device.

15. The method according to claim 1, wherein arranging the deflecting device includes abutting an annular contact portion of the deflecting device against a radially inner annular wall of the piston lower part.

16. The method according to claim 1, further comprising cooling the deflecting device while joining the piston upper part and the piston lower part.

17. The method according to claim 16, wherein cooling the deflecting device includes providing a cooling agent to the deflecting device.

18. The method according to claim 17, wherein providing the cooling agent to the deflecting device includes flowing the cooling agent through a cooling agent duct of the deflecting device.

19. A method for producing a piston for an internal combustion engine, comprising:
   arranging a piston upper part and a piston lower part in a friction welding device, wherein the piston upper part has a piston head with a combustion recess, and wherein the piston lower part has two mutually opposite skirt elements connected to one another via two mutually opposite pin bosses;
   arranging a deflecting device to deflect at least one weld bead via abutting an annular outer edge of the deflecting device against a radially inner annular wall of the piston lower part, the radially inner annular wall disposed radially between the two skirt elements and radially between the two pin bosses; and
   joining the piston upper part and the piston lower part to one another via friction welding.

20. A method for producing a piston for an internal combustion engine, comprising:
   arranging a piston upper part and a piston lower part in a friction welding device, wherein the piston upper part has a piston head with a combustion recess, and wherein the piston lower part has two mutually opposite skirt elements connected to one another via two mutually opposite pin bosses;
   arranging a deflecting device configured to deflect at least one weld bead one of on and in the friction welding device;
   joining the piston upper part and the piston lower part to one another via friction welding;
   wherein joining the piston upper part and the piston lower part includes forming a cooling duct, the piston lower part including a radially inner annular wall and a radially outer annular wall projecting from the two skirt elements towards the piston upper part such that an interspace defined between the radially inner annular wall and the radially outer annular wall defines a lower part of the cooling duct; and
   wherein arranging the deflecting device includes arranging the deflecting device such that an annular contact portion of the deflecting device bears against the radially inner annular wall of the piston lower part.

* * * * *